No. 778,594. Patented December 27, 1904.

UNITED STATES PATENT OFFICE.

PANCRAZIO M. MEGARO, OF NEWARK, NEW JERSEY.

SHAVING COMPOSITION.

SPECIFICATION forming part of Letters Patent No. 778,594, dated December 27, 1904.

Application filed June 29, 1904. Serial No. 214,573.

*To all whom it may concern:*

Be it known that I, PANCRAZIO M. MEGARO, a citizen of the United States of America, and a resident of No. 313 High street, in the city of Newark, county of Essex, and State of New Jersey, have invented certain new and useful Improvements in Shaving Compositions, of which the following is a specification.

My composition consists of the following ingredients combined in the proportion stated, viz:

Formula: unslaked lime, (oxid of calcium,) two and one-half ounces; white-poplar ashes, one pound; cow's fat, one pound; essence of bitter-almonds, twenty drops; water, substantially pure, indefinite quantity.

Preparation: First, mix well together in a suitable wooden vessel unslaked lime and white-poplar ashes, adding gradually sufficient water to dilute the said two ingredients, and then let them rest for twenty-four hours; second, liquefy the cow's fat in a suitable vessel, and after the liquefaction of it and while under the action of a gradually-increasing heat add and well mix the lime and ashes, diluted as above specified, and then let all the matter slowly boil until it has reached a status of a paste of a very soft consistency; third, allow the substance thus obtained to cool off, then scent it with the essence of bitter-almonds, and preserve in suitable glass or porcelain vessel well covered.

I am aware that there are a number of compositions more or less consisting of the ingredients hereinabove mentioned; but I am not aware that all the ingredients of my composition have been used together in the proportions and in the manner adopted by me.

My composition is used for shaving purposes only. It is of a very soft consistency, white-yellowish in color, and has a slight bitter-almond odor.

A small quantity of my composition in contact with a wet surface and working it with a slight firm rubbing will give a rich, creamy, and non-drying lather possessing a great softening and soothing quality.

What I claim, and desire to secure by Letters Patent of the United States, is—

1. The herein-described composition of matter consisting of unslaked lime, white-poplar ashes, cow's fat, essence of bitter-almonds, and water, substantially as described and for the purpose specified.

2. The herein-described composition of matter for shaving purposes consisting of unslaked lime two and one-half ounces, white-poplar ashes one pound, cow's fat one pound, essence of bitter-almonds, twenty drops, and pure water in an indefinite quantity, mixed, diluted, boiled, and cooled off, substantially as described, and for the purpose specified.

Signed at New York city this 29th day of April, 1904.

PANCRAZIO M. MEGARO.

Witnesses:
ABRAHAM SPIES,
ABRAHAM BEHRIN.